(12) United States Patent
Chari et al.

(10) Patent No.: US 11,760,376 B2
(45) Date of Patent: Sep. 19, 2023

(54) MACHINE LEARNING UPDATING WITH SENSOR DATA

(71) Applicant: Ford Global Technologies, LLC, Dearborn, MI (US)

(72) Inventors: Varun Chari, Novi, MI (US); Basavaraj Tonshal, Northville, MI (US); Panduranga Kondoju, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 354 days.

(21) Appl. No.: 17/136,093

(22) Filed: Dec. 29, 2020

(65) Prior Publication Data

US 2022/0204015 A1 Jun. 30, 2022

(51) Int. Cl.
| | | |
|---|---|---|
| B60W 60/00 | (2020.01) | |
| H04L 67/12 | (2022.01) | |
| B60W 50/00 | (2006.01) | |
| G06N 20/00 | (2019.01) | |
| G06N 5/04 | (2023.01) | |
| H04Q 9/00 | (2006.01) | |
| G06V 20/58 | (2022.01) | |
| G06F 18/214 | (2023.01) | |

(52) U.S. Cl.
CPC .......... *B60W 60/00* (2020.02); *B60W 50/00* (2013.01); *G06F 18/214* (2023.01); *G06N 5/04* (2013.01); *G06N 20/00* (2019.01); *G06V 20/58* (2022.01); *G06V 20/582* (2022.01); *H04L 67/12* (2013.01); *H04Q 9/00* (2013.01); *B60W 2050/0075* (2013.01); *B60W 2556/45* (2020.02); *H04Q 2209/823* (2013.01)

(58) Field of Classification Search
CPC ...... B60W 60/00; B60W 50/00; G06N 20/00; G06N 5/04; G06V 20/58; G06V 20/582; G06F 18/214; H04L 67/12; H04Q 9/00
See application file for complete search history.

(56) References Cited

U.S. PATENT DOCUMENTS

| | | |
|---|---|---|
| 10,762,396 B2 | 9/2020 | Vallespi-Gonzalez et al. |
| 2017/0169358 A1* | 6/2017 | Choi ............... G06N 20/00 |
| 2019/0147255 A1 | 5/2019 | Homayounfar et al. |

(Continued)

FOREIGN PATENT DOCUMENTS

WO 2019238367 A1 12/2019

*Primary Examiner* — Peter D Nolan
*Assistant Examiner* — Mikko Okechukwu Obioha
(74) *Attorney, Agent, or Firm* — Brandon Hicks; Bejin Bieneman PLC

(57) ABSTRACT

A system includes a vehicle control module, a vehicle gateway module, and a wired vehicle communications network communicatively coupling the vehicle gateway module to the vehicle control module. The vehicle control module is programmed to receive sensor data from at least one sensor, execute a machine-learning program trained to determine whether the sensor data satisfies at least one criterion, and transmit the sensor data satisfying the at least one criterion to the vehicle gateway module. The vehicle gateway module is programmed to transmit the machine-learning program to the vehicle control module; upon receiving the sensor data from the vehicle control module, store the sensor data; and upon establishing a connection with a remote server, transmit the sensor data to the remote server.

20 Claims, 4 Drawing Sheets

(56) References Cited

U.S. PATENT DOCUMENTS

| | | | |
|---|---|---|---|
| 2019/0205765 A1* | 7/2019 | Mondello | G06N 3/045 |
| 2020/0132011 A1* | 4/2020 | Kitagawa | F02D 29/02 |
| 2021/0078611 A1* | 3/2021 | Hayes | G06F 18/24317 |
| 2021/0124962 A1* | 4/2021 | Kim | G06V 20/597 |
| 2021/0347379 A1* | 11/2021 | Je | B60W 60/001 |
| 2022/0169268 A1* | 6/2022 | Chiba | G07C 5/008 |

* cited by examiner

MACHINE LEARNING UPDATING WITH SENSOR DATA

BACKGROUND

Data collected in vehicles has traditionally been structured data. Structured data is data that is organized in a standardized format. For vehicles, data that is sent through the Controller Area Network (CAN) bus is typically in the Database Container (.dbc) file format, which is a type of structured data.

DETAILED DESCRIPTION

Figure 1:
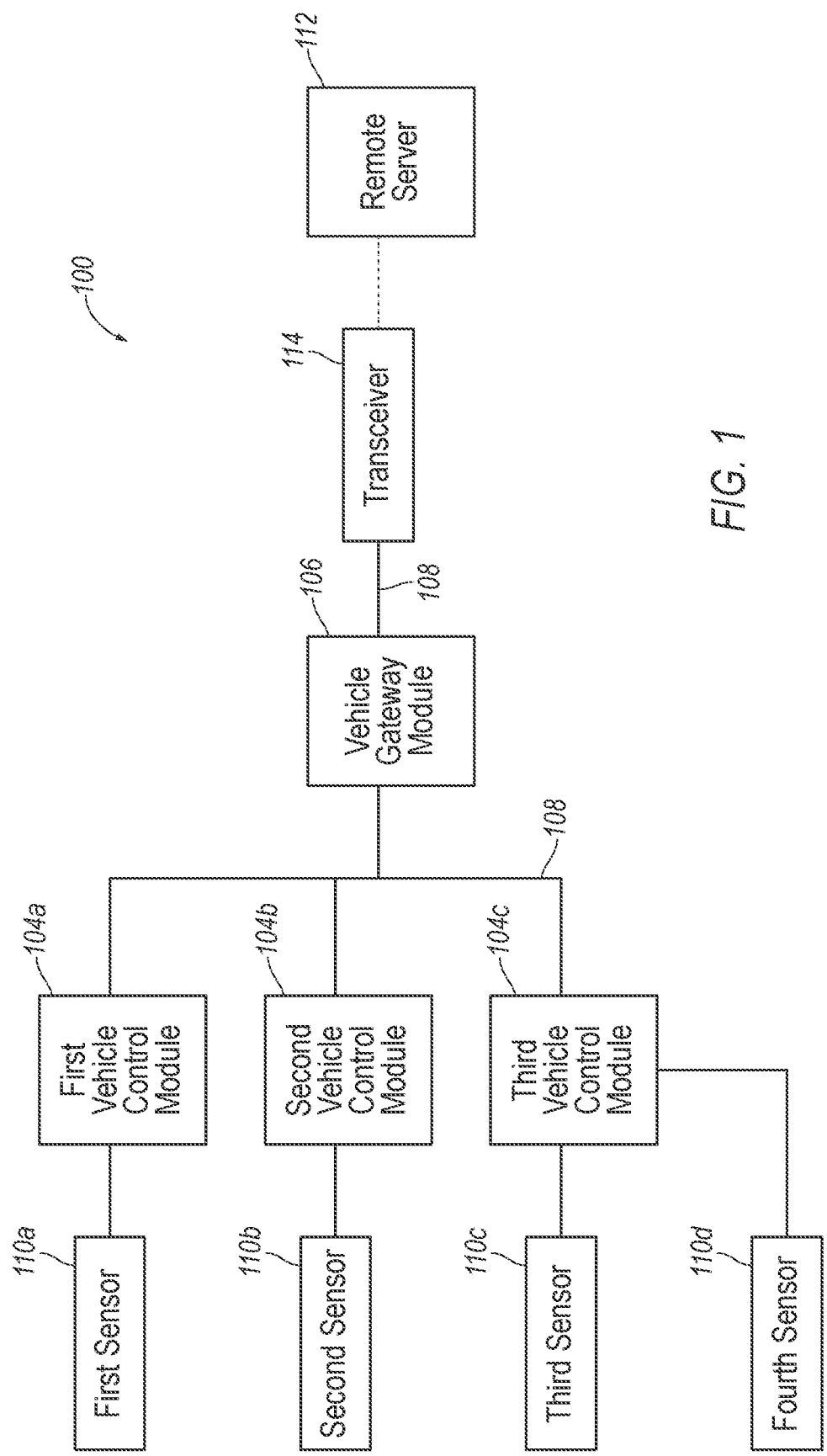
FIG. 1 is a block diagram of an example system for a vehicle.

A system includes a vehicle control module, a vehicle gateway module, and a wired vehicle communications network communicatively coupling the vehicle gateway module to the vehicle control module. The vehicle control module is programmed to receive sensor data from at least one sensor, execute a machine-learning program trained to determine whether the sensor data satisfies at least one criterion, and transmit the sensor data satisfying the at least one criterion to the vehicle gateway module. The vehicle gateway module is programmed to transmit the machine-learning program to the vehicle control module; upon receiving the sensor data from the vehicle control module, store the sensor data; and upon establishing a connection with a remote server, transmit the sensor data to the remote server.

The vehicle control module may be further programmed to delete the sensor data after transmitting the sensor data to the vehicle gateway module.

The vehicle control module may be further programmed to delete the sensor data after executing the machine-learning program to determine that the sensor data fails to satisfy the at least one criterion.

The vehicle gateway module may be further programmed to, upon receiving the sensor data from the vehicle control module, add metadata to the sensor data, and to transmit the metadata to the remote server when transmitting the sensor data to the remote server. The metadata may include location data. The metadata may include time data.

The vehicle gateway module may be further programmed to transmit a notification to the vehicle control module upon detecting that a prespecified event occurred. The vehicle control module may be further programmed to, upon receiving the notification, transmit the sensor data from a predetermined time before the notification. The prespecified event may include at least one of a triggering of an impact sensor, an airbag deployment, or a brake force above a threshold.

The vehicle control module may be a first vehicle control module, the at least one sensor may be at least one first sensor, the sensor data may be first sensor data, the machine-learning program may be a first machine-learning program, the at least one criterion may be at least one first criterion, the system may further include a second vehicle control module communicatively coupled to the vehicle gateway module via the wired vehicle communications network, and the second vehicle control module may be programmed to receive second sensor data from at least one second sensor, execute a second machine-learning program trained to determine whether the second sensor data satisfies at least one second criterion, and transmit the second sensor data satisfying the at least one second criterion to the vehicle gateway module. The vehicle gateway module may be further programmed to, upon receiving the first or second machine-learning program from the remote server, determine to which of the first or second vehicle control module to transmit the first or second machine-learning program.

The system may further include the remote server, and the remote server may be programmed to train the machine-learning program with a dataset including the sensor data received from the vehicle gateway module. The remote server may be further programmed to transmit the machine-learning program to the vehicle gateway module.

The at least one criterion may include image recognition of a prespecified type of roadway user. The prespecified type of roadway user may be at least one of a pedestrian, a bicycle, or a nonvehicular moving object.

The at least one criterion may include image recognition of a prespecified type of roadway sign. The prespecified type of roadway sign may be at least one of a damaged sign or an occluded sign.

The at least one criterion may include image recognition of a prespecified type of roadway section. The prespecified type of roadway section may be at least one of a roundabout, a tollway entrance, or a construction zone.

A method includes transmitting a machine-learning program to a vehicle control module by a vehicle gateway module, wherein the machine-learning program is trained to determine whether sensor data satisfies at least one criterion; executing the machine-learning program by the vehicle control module; transmitting the sensor data satisfying the at least one criterion to the vehicle gateway module by the vehicle control module; upon receiving the sensor data from the vehicle control module, storing the sensor data by the vehicle gateway module; upon establishing a connection with a remote server, transmitting the sensor data to the remote server by the vehicle gateway module; and training the machine-learning program with a dataset including the sensor data received from the vehicle gateway module by the remote server.

With reference to the Figures, a system 102 in a vehicle 100 includes a first vehicle control module 104a, a vehicle gateway module 106, and a wired vehicle communications network 108 communicatively coupling the vehicle gateway module 106 to the first vehicle control module 104a. The first vehicle control module 104a is programmed to receive sensor data from a first sensor 110a, execute a machine-learning program trained to determine whether the sensor data satisfies at least one criterion, and transmit the sensor data satisfying the at least one criterion to the vehicle gateway module 106. The vehicle gateway module 106 is programmed to transmit the machine-learning program to the vehicle control module 104; upon receiving the sensor data from the vehicle control module 104, store the sensor data; and upon establishing a connection with a remote server 112, transmit the sensor data to the remote server 112.

The system 102 promotes efficient handling of unstructured data, which is more difficult, i.e., can require more processing resources, more complex and potentially inefficient programming, and/or time, to handle than structured data. Sensors 110 including the first sensor 110a, e.g., cameras, produce unstructured data. The vehicle control modules 104 responsible for the sensors 110 have more processing power than the vehicle gateway module 106, so it is more efficient for the vehicle control module 104 to execute the machine-learning program than the vehicle gateway module 106 to. Also, performing this processing closer to the sensors 110 reduces latency. The vehicle gateway module 106 has more storage capacity than the vehicle control module 104, so it is more efficient for the vehicle gateway module 106 to store the sensor data until establishing the connection with the remote server 112. This arrangement is also efficient because the vehicle control module 104 and the vehicle gateway module 106 are operating in parallel. Moreover, by using the machine-learning program to determine whether the sensor data satisfies the at least one criterion, the vehicle control module 104 can greatly reduce the quantity of sensor data transmitted to the vehicle gateway module 106 compared with transmitting all the sensor data as it is received, e.g., video streaming. The reduced quantity of sensor data reduces the consumed bandwidth of the wired vehicle communications network 108, permits a small payload size sent from the respective vehicle control module 104 to the vehicle gateway module 106, and reduces network congestion on the wired vehicle communications network 108. Because of the relative complexity of unstructured data, this reduction has a greater impact for unstructured data like the sensor data than for structured data.

With reference to FIG. 1, the vehicle 100 may be any suitable type of automobile, e.g., a passenger or commercial automobile such as a sedan, a coupe, a truck, a sport utility, a crossover, a van, a minivan, a taxi, a bus, etc. The vehicle 100, for example, may be autonomous. In other words, the vehicle 100 may be autonomously operated such that the vehicle 100 may be driven without constant attention from a driver, i.e., the vehicle 100 may be self-driving without human input.

The wired vehicle communications network 108 can include multiple networks such as a controller area network (CAN) bus, Ethernet, Local Interconnect Network (LIN), onboard diagnostics connector (OBD-II), etc. The wired vehicle communications network 108 communicatively couples the vehicle gateway module 106 to a plurality of vehicle control modules 104 including the first vehicle control module 104a, to a transceiver 114, and to other components (not shown).

The vehicle gateway module 106 is a control module that connects and transmits data between subparts of the wired vehicle communications network 108, i.e., networks of different domains in the vehicle 100, e.g., the CAN bus, Ethernet, LIN, OBD-II, etc., which can have different baud rates. The vehicle gateway module 106 is a microprocessor-based computing device, e.g., a generic computing device including a processor and a memory, an electronic controller or the like, a field-programmable gate array (FPGA), an application-specific integrated circuit (ASIC), etc. The vehicle gateway module 106 can thus include a processor, a memory, etc. The memory of the vehicle gateway module 106 can include media for storing instructions executable by the processor as well as for electronically storing data and/or databases, and/or the vehicle gateway module 106 can include structures such as the foregoing by which programming is provided.

The system 102 includes a plurality of the vehicle control modules 104, e.g., the first vehicle control module 104a, a second vehicle control module 104b, a third vehicle control module 104c, etc. Each vehicle control module 104 is a microprocessor-based computing device, e.g., a generic computing device including a processor and a memory, an electronic controller or the like, a field-programmable gate array (FPGA), an application-specific integrated circuit (ASIC), etc. Each vehicle control module 104 can thus include a processor, a memory, etc. The memory of each vehicle control module 104 can include media for storing instructions executable by the processor as well as for electronically storing data and/or databases, and/or each vehicle control module 104 can include structures such as the foregoing by which programming is provided. The vehicle control modules 104 each have a more powerful processor than the vehicle gateway module 106 does, and the vehicle control modules 104 each have less memory than the vehicle gateway module 106 does.

The system 102 includes a plurality of sensors 110, e.g., the first sensor 110a, a second sensor 110b, a third sensor 110c, a fourth sensor 110d, etc. The sensors 110 can be optical sensors 110. For example, the sensor 110 can be cameras and can detect electromagnetic radiation in some range of wavelengths. For example, the sensors 110 may detect visible light, infrared radiation, ultraviolet light, or some range of wavelengths including visible, infrared, and/or ultraviolet light. Each sensor 110 is communicatively coupled to one of the vehicle control modules 104. Each vehicle control module 104 can have one sensor 110 coupled to it, e.g., the first sensor 110a is coupled to the first vehicle control module 104a, and the second sensor 110b is coupled to the second vehicle control module 104b, or can have multiple sensors 110 coupled to it, e.g., the third sensor 110c and the fourth sensor 110d are coupled to the third vehicle control module 104c. The sensors 110 output unstructured data to the respective vehicle control modules 104. Image data and audio data are two examples of unstructured data.

The transceiver 114 may be adapted to transmit signals wirelessly through any suitable wireless communication protocol, such as Bluetooth®, WiFi, IEEE 802.11a/b/g, other RF (radio frequency) communications, etc. The transceiver 114 may be adapted to communicate with the remote server 112. The transceiver 114 may be one device or may include a separate transmitter and receiver.

The remote server 112 is a server distinct and spaced from the vehicle 100. The remote server 112 is located outside the vehicle 100. For example, the remote server 112 may be associated with another vehicle 100 (e.g., V2V communications), an infrastructure component (e.g., V2I communications via Dedicated Short-Range Communications (DSRC) or the like), an emergency responder, a mobile device associated with the owner of the vehicle 100, etc. In particular, the remote server 112 is a server responsible for communicating with and updating a plurality of vehicles including the vehicle 100. The remote server 112 is a microprocessor-based computing device, e.g., a generic computing device including a processor and a memory. The remote server 112 can thus include a processor, a memory, etc. The memory of the remote server 112 can include media for storing instructions executable by the processor as well as for electronically storing data and/or databases, and/or the remote server 112 can include structures such as the foregoing by which programming is provided. The remote server 112 can be multiple computers coupled together.

Figure 2:
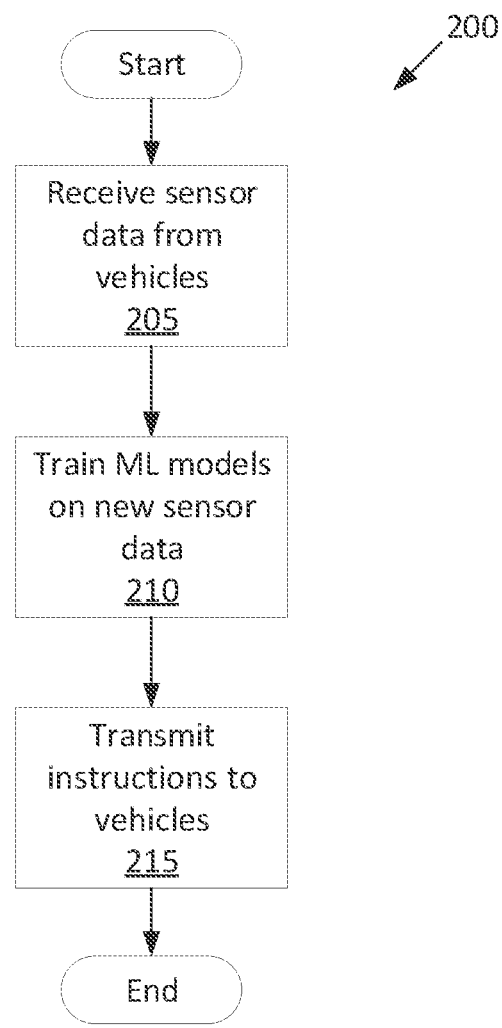
FIG. 2 is a process flow diagram of an example process for training a machine-learning program.

FIG. 2 is a process flow diagram illustrating an exemplary process 200 for training the machine-learning program to be deployed to vehicle control modules 104. The memory of the remote server 112 stores executable instructions for performing the steps of the process 200 and/or programming can be implemented in structures such as mentioned above. As a general overview of the process 200, the remote server 112 receives sensor data from vehicles including the vehicle 100, trains a machine-learning program using the sensor data at least in part, and transmits the trained machine-learning program to the vehicles including the vehicle 100 along with configuration data and scripts. Once the vehicle 100 receives the machine-learning program, the vehicle gateway module 106 distributes the machine-learning program to the appropriate vehicle control module 104 (as described below with respect to a process 300), and the vehicle control module 104 executes the machine-learning program (as described below with respect to a process 400). By executing the machine-learning program, the vehicle control module 104 can minimize collection of sensor data, which is unstructured, while still collecting sensor data that is important or interesting (e.g., relevant to identifying objects, conditions around a vehicle, etc.). Providing the sensor data back to the remote server 112 forms a feedback loop for continually improving the machine-learning program.

The process 200 begins in a block 205, in which the remote server 112 receives the sensor data from the vehicle 100, specifically as sent by the transceiver 114, as well as from other vehicles. The sensor data is unstructured data, e.g., image data or audio data. As described below, the sensor data is chosen to have features of interest for training the machine-learning program, e.g., image data of a bicycle for training image recognition of bicycles.

Next, in a block 210, the remote server 112 trains the machine-learning program so that the machine-learning program determines whether sensor data satisfies at least one criterion, e.g., that image data shows a bicycle. The remote server 112 trains the machine-learning program with a dataset including the sensor data received by the remote server 112 from the vehicle 100. The machine-learning program can be an image-recognition algorithm or other classifier algorithm, e.g., an artificial neural network or convolutional neural network. The criteria can be recognition or classification of particular objects such as a prespecified type of roadway user, e.g., a pedestrian, a bicycle, a type of vehicle, or a nonvehicular moving object; a prespecified type of roadway sign, e.g., a damaged sign or an occluded sign; a prespecified type of roadway section, e.g., a roundabout, a tollway entrance, or a construction zone; etc. A convolutional neural network includes a series of layers, with each layer using the previous layer as input. Each layer contains a plurality of neurons that receive as input data generated by a subset of the neurons of the previous layers and generate output that is sent to neurons in the next layer. Types of layers include convolutional layers, which compute a dot product of a weight and a small region of input data; pool layers, which perform a downsampling operation along spatial dimensions; and fully connected layers, which generate based on the output of all neurons of the previous layer. The final layer of the convolutional neural network generates a score for each potential object, and the final output is the object with the highest score. The dataset used for training, including the sensor data received from the vehicle 100, can be labeled with the actual objects present, e.g., by humans. The remote server 112 can add or remove a criterion from a previous version of the machine-learning program. The remote server 112 can include configuration data for the sensors 110, e.g., frame rate, resolution, etc., and scripts with the machine-learning program. As described below, scripts are used to determine when a prespecified event of interest occurs. A developer can use the sensor data received in the block 205 when developing the configuration data and the scripts.

Next, in a block 215, the remote server 112 transmits instructions including the trained machine-learning program, the configuration data, and the scripts to the vehicle 100, specifically to the vehicle gateway module 106 via the transceiver 114. The remote server 112 can store the instructions until the vehicle gateway module 106 establishes a connection, and then the remote server 112 transmits the instructions. After the block 215, the process 200 ends.

Figure 3:
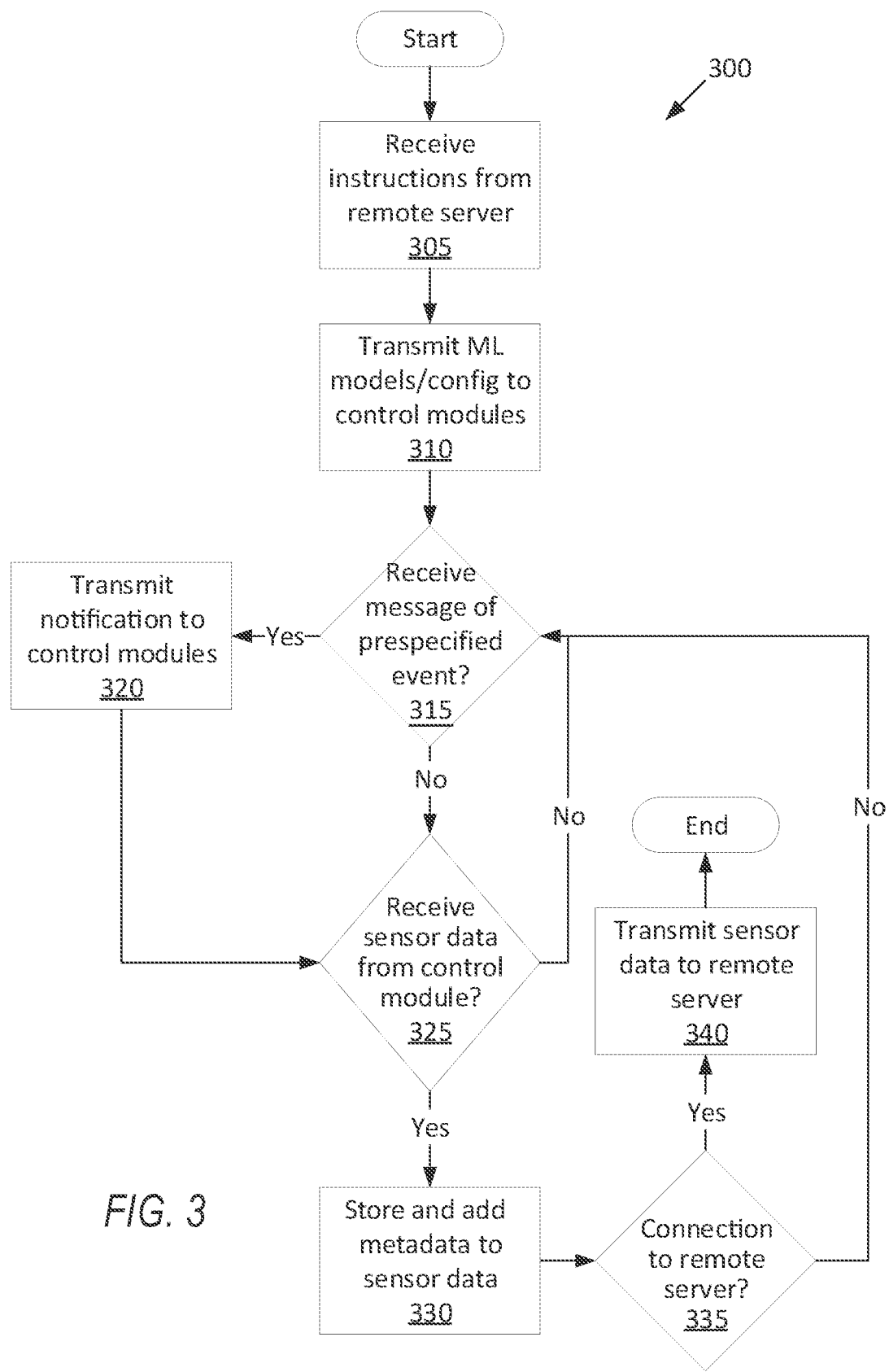
FIG. 3 is a process flow diagram of an example process for distributing the machine-learning program and transmitting sensor data to a remote server.

FIG. 3 is a process flow diagram illustrating an exemplary process 300 for distributing the machine-learning program to one of the vehicle control modules 104 and transmitting the sensor data to the remote server 112. The memory of the vehicle gateway module 106 stores executable instructions for performing the steps of the process 300 and/or programming can be implemented in structures such as mentioned above. As a general overview of the process 300, the vehicle gateway module 106 receives the instructions from the remote server 112 and transmits the machine-learning program and the configuration data to one or more of the vehicle control modules 104. Upon running the scripts to detect that a prespecified event occurred, the vehicle gateway module 106 transmits a notification to the vehicle control modules 104. Prespecified events can be chosen to indicate that contemporaneous sensor data may be of interest, e.g., image data of surroundings of the vehicle 100 during an airbag deployment. Upon receiving the sensor data from one of the vehicle control modules 104, the vehicle gateway module 106 stores and adds metadata to the sensor data and transmits the sensor data to the remote server 112 upon establishing a connection with the remote server 112.

The process 300 begins in a block 305, in which the vehicle gateway module 106 receives the instructions from the remote server 112 via the transceiver 114. If the instructions included any scripts, the vehicle gateway module 106 installs the scripts.

Next, in a block 310, the vehicle gateway module 106 determines to which vehicle control module 104 to transmit the machine-learning program and configuration data and transmits the machine-learning program and configuration data over the wired vehicle communications network 108 to that vehicle control module 104. The machine-learning program and/or configuration data transmitted from the remote server 112 include data specifying which vehicle control module 104 should receive the machine-learning program and/or configuration data. If the machine-learning program and/or configuration data include data specifying the first vehicle control module 104a (referred to as a first machine-learning program), the vehicle gateway module 106 transmits them to the first vehicle control module 104a; if they include data specifying the second vehicle control module 104b (referred to as a second machine-learning program), the vehicle gateway module 106 transmits them to the second vehicle control module 104b; and so on.

Next, in a decision block 315, the vehicle gateway module 106 runs the scripts to determine whether a prespecified event occurred. For the purposes of this disclosure, a "prespecified event" is an occurrence in the operation of the vehicle 100 that is defined in advance and stored in memory and that is then determined according to data received over the wired vehicle communications network 108 being compared to data stored in the memory defining the occurrence. One of the scripts stored in the memory of the vehicle gateway module 106 is an algorithm for determining whether the prespecified event occurred. The prespecified events are chosen to indicate that contemporaneous sensor data is likely to be of interest, according to data other than the sensor data. For example, the prespecified event can include at least one of a triggering of an impact sensor, an airbag deployment, or a brake force above a threshold, in which case image data of the surroundings of the vehicle 100 are likely to be of interest, e.g., show objects or situations for image recognition to be trained to recognize. The vehicle gateway module 106 can determine whether the prespecified event occurred by whether the vehicle gateway module 106 received a message from a vehicle control module 104 including data indicating that the prespecified event occurred, e.g., a message from a restraint control module indicating the triggering of the impact sensor or the airbag deployment, or a message from an antilock-brake-system (ABS) control module indicating the brake force. The messages can be broadcast over the wired vehicle communications network 108 rather than transmitted to the vehicle gateway module 106 in particular. If the vehicle gateway module 106 determines that the prespecified event occurred, the process 300 proceeds to a block 320. If the vehicle gateway module 106 does not determine that the prespecified event occurred, the process 300 proceeds to a decision block 325.

In the block 320, the vehicle gateway module 106 transmits a notification to one or more of the vehicle control modules 104 indicating that the prespecified event occurred. As a result of installing the script on the vehicle gateway module 106, the vehicle gateway module 106 can include a table in memory listing the vehicle control modules 104 to which to send the notification paired with the prespecified events. The vehicle gateway module 106 transmits the notification to the vehicle control modules 104 listed in the table for the prespecified event. As described below, the notification prompts the vehicle control module 104 to transmit sensor data to the vehicle gateway module 106. After the block 320, the process 300 proceeds to the decision block 325.

In the decision block 325, the vehicle gateway module 106 determines whether the vehicle gateway module 106 received the sensor data from one of the vehicle control modules 104, i.e., first sensor data from the first vehicle control module 104a, second sensor data from the second vehicle control module 104b, etc. If the vehicle gateway module 106 did not receive the sensor data, the process 300 returns to the decision block 315 to continue monitoring for prespecified events and sensor data. If the vehicle gateway module 106 received the sensor data, the process 300 proceeds to a block 330.

In the block 330, the vehicle gateway module 106 stores the sensor data in memory and adds metadata to the sensor data. The metadata includes location data, time data, and which vehicle control module 104 transmitted the sensor data. The location data can be, e.g., global positioning system (GPS) data reported by a GPS sensor over the wired vehicle communications network 108. The time data can be from an internal clock. The sensor data can be collected from multiple vehicle control modules 104. Collecting the sensor data from multiple vehicle control modules 104 in one location permits multiplexing and permits determinations to be drawn that would not be possible with sensor data from a single vehicle control module 104.

Next, in a decision block 335, the vehicle gateway module 106 determines whether a connection is established with the remote server 112. For example, the vehicle gateway module 106 can determine whether the transceiver 114 is connected to a wireless network, or a specific wireless network such as Bluetooth or WiFi, connected to the internet. For another example, the remote server 112 can be on a local wireless network to which the transceiver 114 is connected. By waiting for a specific connection to be established, the vehicle gateway module 106 can provide a low upload cost by performing the uploads on cheap network connections. If a connection is not established with the remote server 112, the process 300 returns to the decision block 315 to continue monitoring for prespecified events and additional sensor data while waiting for the connection to be established. By storing the sensor data, which is complicated unstructured data, the vehicle gateway module 106 frees up the vehicle control module 104 to delete the sensor data. If a connection is established, the process 300 proceeds to a block 340.

In the block 340, the vehicle gateway module 106 transmits the sensor data, along with the metadata, to the remote server 112. The vehicle gateway module 106 does not transform the sensor data or extract a portion of the sensor data before transmitting the sensor data. After transmitting the sensor data, the vehicle gateway module 106 can delete the sensor data and metadata. After the block 340, the process 300 ends.

Figure 4:
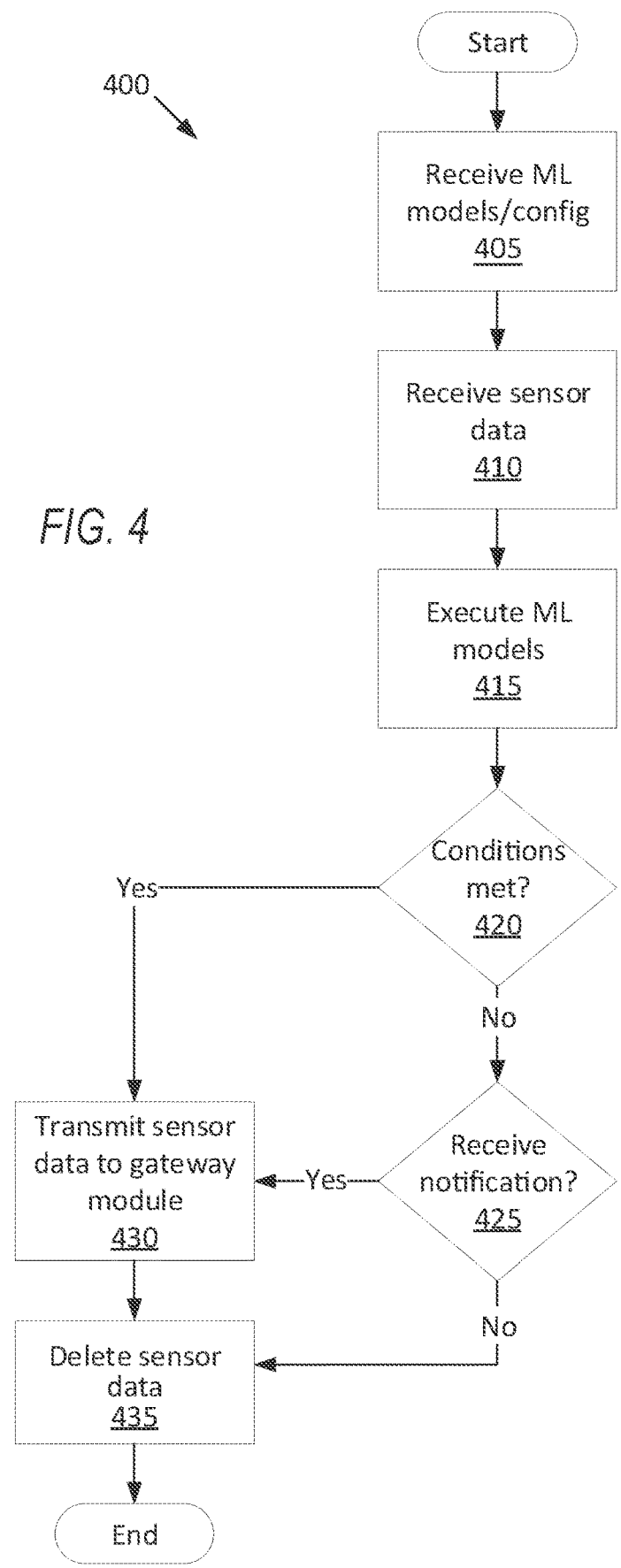
FIG. 4 is a process flow diagram of an example process for executing the machine-learning program.

FIG. 4 is a process flow diagram illustrating an exemplary process 400 for executing the machine-learning program in a vehicle control module 104. The memory of each vehicle control module 104 stores executable instructions for performing the steps of the process 400 and/or programming can be implemented in structures such as mentioned above. As a general overview of the process 400, the vehicle control module 104 receives and installs the machine-learning program and configuration data, receives sensor data from the respective sensor 110 or sensors 110, executes the machine-learning program, transmits the sensor data to the vehicle gateway module 106 if either the criteria in the machine-learning program are met or the vehicle control module 104 received the notification from the vehicle gateway module 106, and deletes the sensor data. For example, the vehicle control module 104 can be a camera control module that receives image data, performs image recognition on the image data, and transmits the image data that contains certain objects to the vehicle gateway module 106.

The process 400 begins in a block 405, in which the vehicle control module 104 receives the machine-learning program and/or the configuration data from the vehicle gateway module 106 via the wired vehicle communications network 108 and then installs the machine-learning program and/or configuration data. The machine-learning program can supersede a previous machine-learning program installed on the vehicle control module 104, and the configuration data can change previous configurations of the vehicle control module 104. The new machine-learning program may have improved from the previous machine-learning program by training with sensor data collected by the previous machine-learning program, as described above with respect to the process 200. If configuration data was included with the machine-learning program, the vehicle control module 104 can configure the respective sensor or sensors 110 according to the configuration data, e.g., for a sensor 110 that is a camera by changing the resolution, frame rate, etc.

Next, in a block 410, the vehicle control module 104 receives sensor data from the sensor or sensors 110 to which the vehicle control module 104 is directly connected, i.e., connected without any other intermediary vehicle control modules 104.

Next, in a block 415, the vehicle control module 104 executes the machine-learning program. The machine-learning program determines whether the sensor data satisfies at least one criterion included in the machine-learning program, e.g., recognition of a particular object or sound or a particular classification. For example, the machine-learning program can be a convolutional neural network, and each criterion can be the score for an object being a particular type of object exceeding any score for the object being another type of object. The criteria can include image recognition of a prespecified type of roadway user, e.g., a pedestrian, a bicycle, a type of vehicle, or a nonvehicular moving object; a prespecified type of roadway sign, e.g., a damaged sign or an occluded sign; a prespecified type of roadway section, e.g., a roundabout, a tollway entrance, or a construction zone; etc. By distributing execution of the machine-learning program to the vehicle control modules 104, the vehicle gateway module 106 has its processing power freed up for other tasks.

Next, in a decision block 420, the vehicle control module 104 determines whether any of the criteria of the machine-learning program are satisfied, e.g., any objects of interest recognized. If none of the criteria are satisfied, the process 400 proceeds to a decision block 425. If at least one of the criteria is satisfied, the process 400 proceeds to a block 430.

In the decision block 425, the vehicle control module 104 determines whether the vehicle control module 104 received the notification. As described above with respect to the block 320 of the process 300, the vehicle gateway module 106 transmits the notification in response to a prespecified event described in a script. If the vehicle control module 104 received the notification, the process 400 proceeds to the block 430. If the vehicle control module 104 did not receive the notification, the process 400 proceeds to a block 435.

In the block 430, the vehicle control module 104 transmits the sensor data to the vehicle gateway module 106 via the wired vehicle communications network 108. For the sensor data satisfying the criteria from the decision block 420, the vehicle control module 104 transmits the sensor data for the period in which at least one of the criteria are satisfied. For the sensor data contemporaneous with receiving the notification in the decision block 425, the vehicle control module 104 transmits the sensor data from a first predetermined time before the notification to a second predetermined time after the notification. The first and second predetermined times are chosen based on a duration of the corresponding prespecified event before and after the notification. After the block 430, the process 400 proceeds to the block 435.

In the block 435, i.e., after transmitting the sensor data to the vehicle gateway module 106 or after determining that the sensor data fails to satisfy any of the criteria, the vehicle control module 104 deletes the sensor data. After the block 435, the process 400 ends.

Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random access memory, etc. A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

The disclosure has been described in an illustrative manner, and it is to be understood that the terminology which has been used is intended to be in the nature of words of description rather than of limitation. Use of "in response to" and "upon determining" indicates a causal relationship, not merely a temporal relationship. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. A system comprising:
a vehicle control module on board a vehicle;
a vehicle gateway module on board the vehicle; and
a wired vehicle communications network on board the vehicle that is communicatively coupling the vehicle gateway module to the vehicle control module, the vehicle gateway module configured to transmit between subnetworks of different domains of the wired vehicle communications network;
wherein the vehicle control module is programmed to
receive sensor data from at least one sensor;
execute a machine-learning program, the machine-learning program previously trained to determine whether the sensor data satisfies at least one criterion, the machine-learning program outputting a determination that the sensor data satisfies the at least one criterion; and
transmit the sensor data satisfying the at least one criterion to the vehicle gateway module; and
the vehicle gateway module is programmed to
transmit the machine-learning program to the vehicle control module;
upon receiving the sensor data from the vehicle control module, store the sensor data; and
upon establishing a connection with a remote server, transmit the sensor data to the remote server.

2. The system of claim 1, wherein the vehicle control module is further programmed to delete the sensor data after transmitting the sensor data to the vehicle gateway module.

3. The system of claim 1, wherein the vehicle control module is further programmed to delete the sensor data after executing the machine-learning program to determine that the sensor data fails to satisfy the at least one criterion.

4. The system of claim 1, wherein the vehicle gateway module is further programmed to, upon receiving the sensor data from the vehicle control module, add metadata to the sensor data, and to transmit the metadata to the remote server when transmitting the sensor data to the remote server.

5. The system of claim 4, wherein the metadata includes location data.

6. The system of claim 4, wherein the metadata includes time data.

7. The system of claim 1, wherein the vehicle gateway module is further programmed to transmit a notification to the vehicle control module upon detecting that a prespecified event occurred.

8. The system of claim 7, wherein the vehicle control module is further programmed to, upon receiving the notification, transmit the sensor data from a predetermined time before the notification.

9. The system of claim 7, wherein the prespecified event includes at least one of a triggering of an impact sensor, an airbag deployment, or a brake force above a threshold.

10. The system of claim 1,
wherein the vehicle control module is a first vehicle control module, the at least one sensor is at least one first sensor, the sensor data is first sensor data, the machine-learning program is a first machine-learning program, and the at least one criterion is at least one first criterion;
the system further comprising a second vehicle control module communicatively coupled to the vehicle gateway module via the wired vehicle communications network;
wherein the second vehicle control module is programmed to
receive second sensor data from at least one second sensor;
execute a second machine-learning program trained to determine whether the second sensor data satisfies at least one second criterion; and
transmit the second sensor data satisfying the at least one second criterion to the vehicle gateway module.

11. The system of claim 10, wherein the vehicle gateway module is further programmed to, upon receiving the first or second machine-learning program from the remote server, determine to which of the first or second vehicle control module to transmit the first or second machine-learning program.

12. The system of claim 1, further comprising the remote server, wherein the remote server is programmed to train the machine-learning program with a dataset including the sensor data received from the vehicle gateway module.

13. The system of claim 12, wherein the remote server is further programmed to transmit the machine-learning program to the vehicle gateway module.

14. The system of claim 1, wherein the at least one criterion includes image recognition of a prespecified type of roadway user.

15. The system of claim 14, wherein the prespecified type of roadway user is at least one of a pedestrian, a bicycle, or a nonvehicular moving object.

16. The system of claim 1, wherein the at least one criterion includes image recognition of a prespecified type of roadway sign.

17. The system of claim 16, wherein the prespecified type of roadway sign is at least one of a damaged sign or an occluded sign.

18. The system of claim 1, wherein the at least one criterion includes image recognition of a prespecified type of roadway section.

19. The system of claim 18, wherein the prespecified type of roadway section is at least one of a roundabout, a tollway entrance, or a construction zone.

20. A method comprising:
transmitting a machine-learning program to a vehicle control module on board a vehicle over a wired vehicle communications network on board the vehicle by a vehicle gateway module on board the vehicle, wherein the vehicle gateway module is configured to transmit between subnetworks of different domains of the wired vehicle communications network, the machine-learning program is previously trained to determine whether sensor data satisfies at least one criterion, and the machine-learning program outputs a determination that the sensor data satisfies the at least one criterion;
executing the machine-learning program by the vehicle control module;
transmitting the sensor data satisfying the at least one criterion to the vehicle gateway module by the vehicle control module;
upon receiving the sensor data from the vehicle control module, storing the sensor data by the vehicle gateway module;
upon establishing a connection with a remote server, transmitting the sensor data to the remote server by the vehicle gateway module; and
training the machine-learning program with a dataset including the sensor data received from the vehicle gateway module by the remote server.

* * * * *